US008708803B2

(12) United States Patent
Gilbertson et al.

(10) Patent No.: US 8,708,803 B2

(45) Date of Patent: Apr. 29, 2014

(54) AWARD FEATURES FOR A GAMING MACHINE AND RELATED METHODS

(75) Inventors: Ross M. Gilbertson, Ultimo (AU); Andrew Masen, Grafton (AU)

(73) Assignee: SHFL Entertainment (Australasia) Pty Limited, Milperra NSW (AU)

( * ) Notice: Subject to any disclaimer, the term of this patent is extended or adjusted under 35 U.S.C. 154(b) by 0 days.

(21) Appl. No.: 13/392,359

(22) PCT Filed: Aug. 24, 2009

(86) PCT No.: PCT/AU2009/001083

§ 371 (c)(1), (2), (4) Date: Feb. 24, 2012

(87) PCT Pub. No.: WO2011/022748

PCT Pub. Date: Mar. 3, 2011

(65) Prior Publication Data

US 2012/0157192 A1 Jun. 21, 2012

(51) Int. Cl.
*G06F 17/00* (2006.01)

(52) U.S. Cl.
USPC .......... 463/25

(58) Field of Classification Search
USPC .......... 463/25
See application file for complete search history.

(56) References Cited

U.S. PATENT DOCUMENTS

| | | | | |
|---|---|---|---|---|
| 2003/0162585 | A1 | 8/2003 | Bigelow et al. | |
| 2004/0235552 | A1* | 11/2004 | Gauselmann | 463/16 |
| 2006/0084497 | A1 | 4/2006 | Marks et al. | |
| 2008/0070695 | A1* | 3/2008 | Baerlocher et al. | 463/42 |
| 2009/0131158 | A1 | 5/2009 | Brunet De Courssou et al. | |

FOREIGN PATENT DOCUMENTS

WO 2011/022748 A1 3/2011

OTHER PUBLICATIONS

International Search Report and the Written Opinion of the International Searching Authority for PCT Application No. PCT/AU2009/001083; Sep. 24, 2009; 10 pages.

* cited by examiner

*Primary Examiner* — Dmitry Suhol
*Assistant Examiner* — Carl V Larsen
(74) *Attorney, Agent, or Firm* — TraskBritt

(57) ABSTRACT

A method for providing an award feature on a gaming machine is provided. The method includes providing a sequential series of games, each game of the sequential series producing a game outcome, which can be a winning or losing outcome. A winning outcome results in an award value to be added to a player's award total. The highest single award value is determined from all award values resulting from all the games of the sequential series of games. Prior to adding the highest single award value to the player's award total, a multiplier is applied to the highest single award value to obtain a multiplied value. The multiplied value is added to the player's award total in place of the highest award value.

30 Claims, 6 Drawing Sheets

AWARD FEATURES FOR A GAMING MACHINE AND RELATED METHODS

FIELD

The present invention relates to gaming machines, such as slot machines and poker machines, and in particular to an award feature on gaming machines.

BACKGROUND

Many gaming machines, also referred to as slot machines, include a bonus or award game feature to add variety and excitement. In one example, the main game is a video version of a reel-type slot machine, where video reels appear to rotate and stop to display a combination of symbols across one or more activated paylines. Certain combinations of symbols across a payline correspond to an award paid to the player, and certain combinations of symbols initiate a bonus game or other form of feature, such as an award multiplier or award of free games.

The randomness in which such features appear can lose the interest of a player if the player cannot perceive an expectation of winning an award of greater return.

It is an object of the present invention to provide an alternative method of providing an award feature on a gaming machine.

SUMMARY

According to a first aspect of the present invention there is provided a method for providing an award feature on a gaming machine, the method including:

- providing a sequential series of games, each game producing a game outcome, which can be a winning or losing outcome, wherein a winning outcome results in an award value to be added to a player's award total;
- determining the highest single award value from all award values resulting from all the games of the series of games;
- prior to adding the highest single award value to the player's award total, applying a multiplier to the highest single award value to obtain a multiplied value and adding the multiplied value to the player's award total in place of the highest award value.

According to a further aspect of the present invention there is provided a method for providing an award feature on a gaming machine, the method including:

- providing a sequential series of games, each game of the sequential series producing a game outcome, which can be a winning or losing outcome, wherein a winning outcome results in an award value;
- prior to commencing the sequential series of games, setting a current highest award value to zero;
- for each game in the sequential series in which a winning outcome occurs:
  - determining the resulting instant award value;
  - comparing the resulting instant award value with the current highest award value;
    - if the resulting instant award value is larger than the current highest award value then:
      - adding the current highest award value to a player's award total; and
      - changing the current highest award value to be the same as the larger instant award value;
    - if the resulting instant award value is not larger than the current highest award value, adding the instant award value to the player's award total;
- at the conclusion of the sequential series of games, applying a multiplier to the current highest award value to obtain a multiplied value; and
- adding the multiplied value to the player's award total.

Exemplary embodiments of the invention provide a feature that engages a player's interest and excitement. Effectively, the player is made aware that a bonus award relating to the application of a multiplier to a highest win value will ultimately result. Consequently, the method provides an incentive to the player to continue playing games to achieve the highest possible win value.

BRIEF DESCRIPTION OF THE DRAWINGS

A preferred embodiment of the present invention will now be described with reference to the accompanying drawings, in which.

DETAILED DESCRIPTION

The present invention lends itself to many different implementations, as will be apparent to those skilled in the art. The following example is intended purely to illustrate one possible implementation. The implementation of the present invention is largely a matter of a relatively straightforward software modification to the various existing games in question.

The invention will be described with reference to an electronic gaming machine (EGM) being programmable to implement one or more different wagering games.

Figure 1:
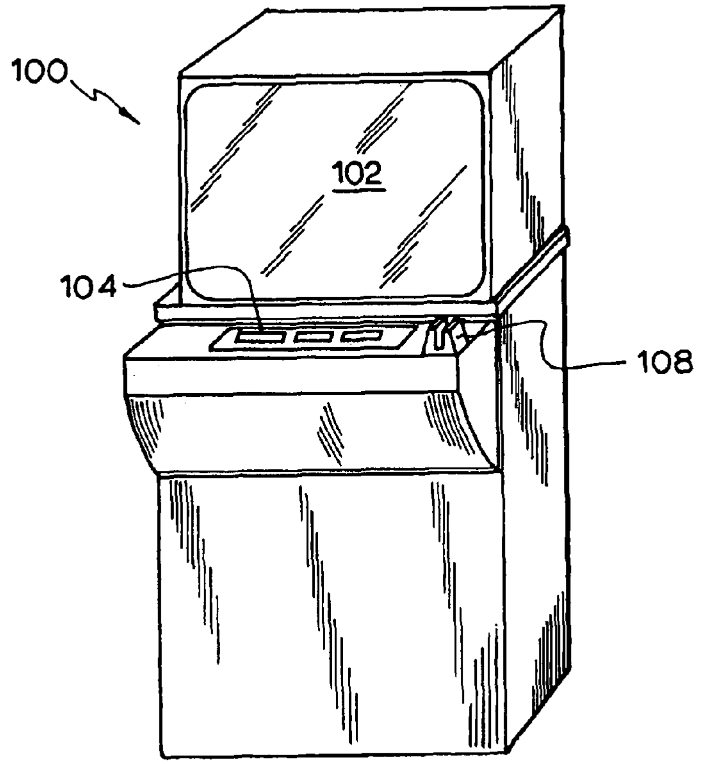
FIG. 1 shows an example of an electronic gaming machine (EGM) in which the invention can be implemented.

FIG. 1 is a diagram illustrative of an electronic gaming machine 100, including a display screen 102, player input buttons 104, and credit or currency input 108. When a player has entered sufficient credits into the credit or currency input 108, the player can select a game using the player input buttons 104 adjacent the display screen 102 or touch screen buttons (not shown) displayed on the display screen 102, or a game can automatically be selected. The player can also select the paylines and credits per line again using the player input buttons 104.

Figure 2:
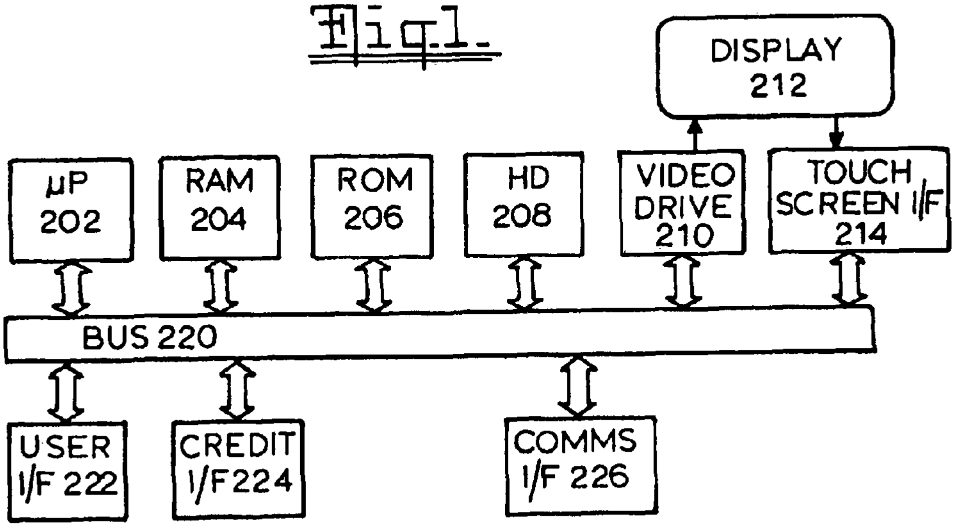
FIG. 2 is a schematic block diagram of the functional elements of an EGM.

FIG. 2 is a block schematic diagram of functional elements of an EGM including a processor 202, shown for illustrative purposes only, as connected via bus 220 to a plurality of functional elements. The EGM can include a display 212 with associated video driver 210 and touch screen interface 214, various storage devices, such as (Random Access Memory) RAM 204, (Read-Only Memory) ROM 206 and hard drive 208, a user interface 222, credit interface 224, and communication interface 226. The EGM can be a stand-alone machine, or it can be connected to a network via the communication interface 226, to enable the machine to participate in multi-game jackpots. In addition, the EGM may be programmed via the communication network from a central control and management processor, so that, for example, new games can be programmed and downloaded into the EGM.

There are numerous available computer languages that may be used to implement embodiments of the invention, among the more common being Ada; Algol; APL; awk; Basic; C; C++; Cobol; DELPHI®; EIFFEL®; Euphoria; Forth; Fortran; HTML; Icon; JAVA®; JAVASCRIPT®; Lisp; Logo; MATHEMATICA®; MATLAB®; Miranda; Modula-2; Oberon; Pascal; PERL®; PL/I; Prolog; PYTHON®; Rexx; SAS®; Scheme; sed; Simula; Smalltalk; Snobol; SQL; VISUAL BASIC®; VISUAL C++®; LINUX® and XML.

Any commercial processor may be used to implement the embodiments of the invention either as a single processor, serial or parallel set of processors in the system. Examples of commercial processors include, but are not limited to, MERCED®, PENTIUM®, PENTIUM II™, PENTIUM XEON™, CELERON®, PENTIUM PRO™, EFFICEON™, ATHLON®, AMD®, and the like.

Display screens may be segment display screens, analogue display screens, digital display screens, CRTs, LED screens, plasma screens, liquid crystal diode screens, and the like.

Figure 3:
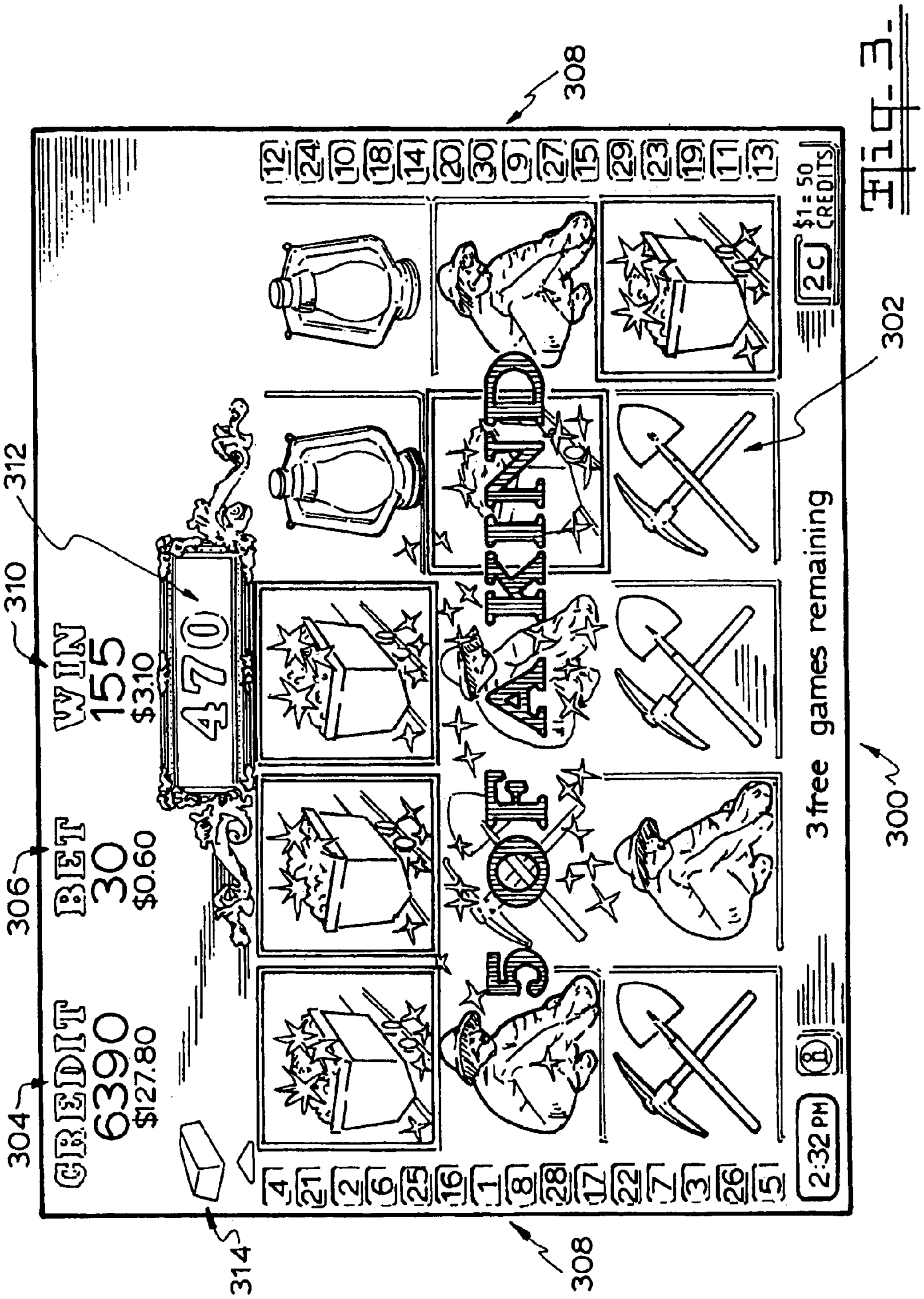
FIGS. 3 through 6 show examples of screenshots of an EGM in which an embodiment of the invention is carried out.

An example of a screenshot 300 displayed on an EGM is shown in FIG. 3. The game displays a 3×5 array of symbol positions 302. At the initiation of a game, different symbols are randomly or pseudo-randomly determined to appear at the symbol positions 302. The appearance of certain combinations of symbols on a wagered payline results in a winning outcome. Winning outcomes result in an award value for the player. The size of the award value can be different depending upon the nature of the resulting combination. Various information is displayed, including the player's current credit level 304, the player's selected wager level 306, an indication of paylines 308 and a total win meter 310 showing the total amount of award values accumulated by the player.

Figure 7:
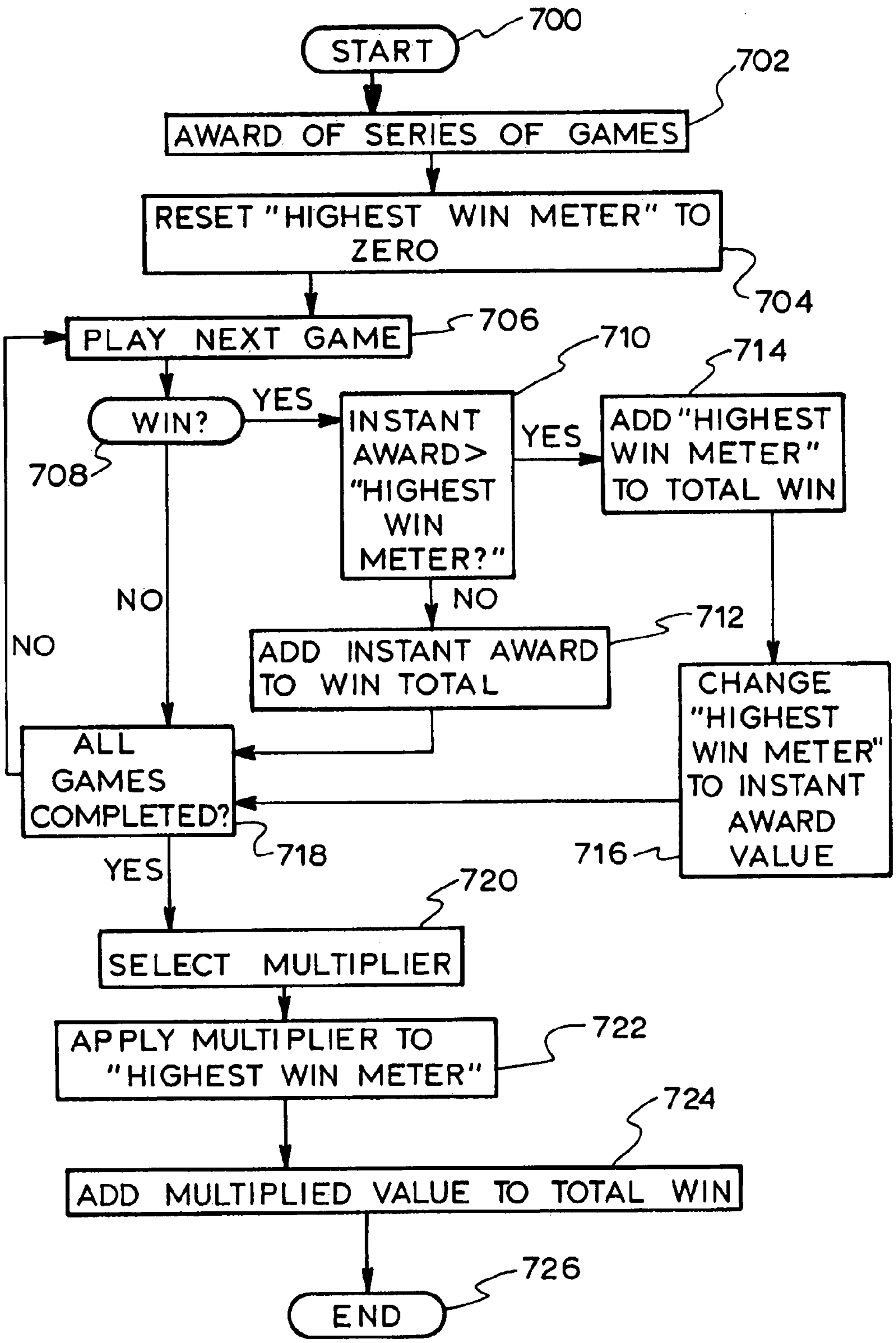
FIG. 7 is a flowchart showing the steps involved in the implementation of an embodiment of the present invention.

The present invention pertains to a method of providing an award feature over the course of a number of a series of sequential games. A flowchart showing the main steps of the method is shown in FIG. 7.

As an exemplary example, the series of sequential games would be a number of free games at 702, which have been triggered upon a particular game outcome occurring at 700. The awarding of a series of free games is a common feature presented in a number of existing EGMs. The number of free games is normally a predetermined number, for example, six. Conceivably the number of free games could be randomly determined.

With continued reference to FIG. 3, a highest win meter 312 is shown. At the start of the series of free games, this highest win meter 312 is reset to zero at 704, and the next game is played at 706. Ideally, a symbol, shown in the form of a gold bar 314, is displayed to indicate to the player that the award feature has been triggered and is being implemented.

The series of games are sequentially played. When a game results in a winning outcome at 708, the respective instant award value is determined at 710. If the instant award value is less than or equal to the current value shown in the highest win meter 312, the instant award value is added directly to the total win meter 310 at 712. If the instant award value is larger than the current value shown in the highest win meter 312, the current value shown in the highest win meter 312 is added to the total win meter 310 at 714 and the highest win meter 312 is changed to show the larger instant award value as the new highest win value at 716 until all games are completed at 718.

Figure 4:
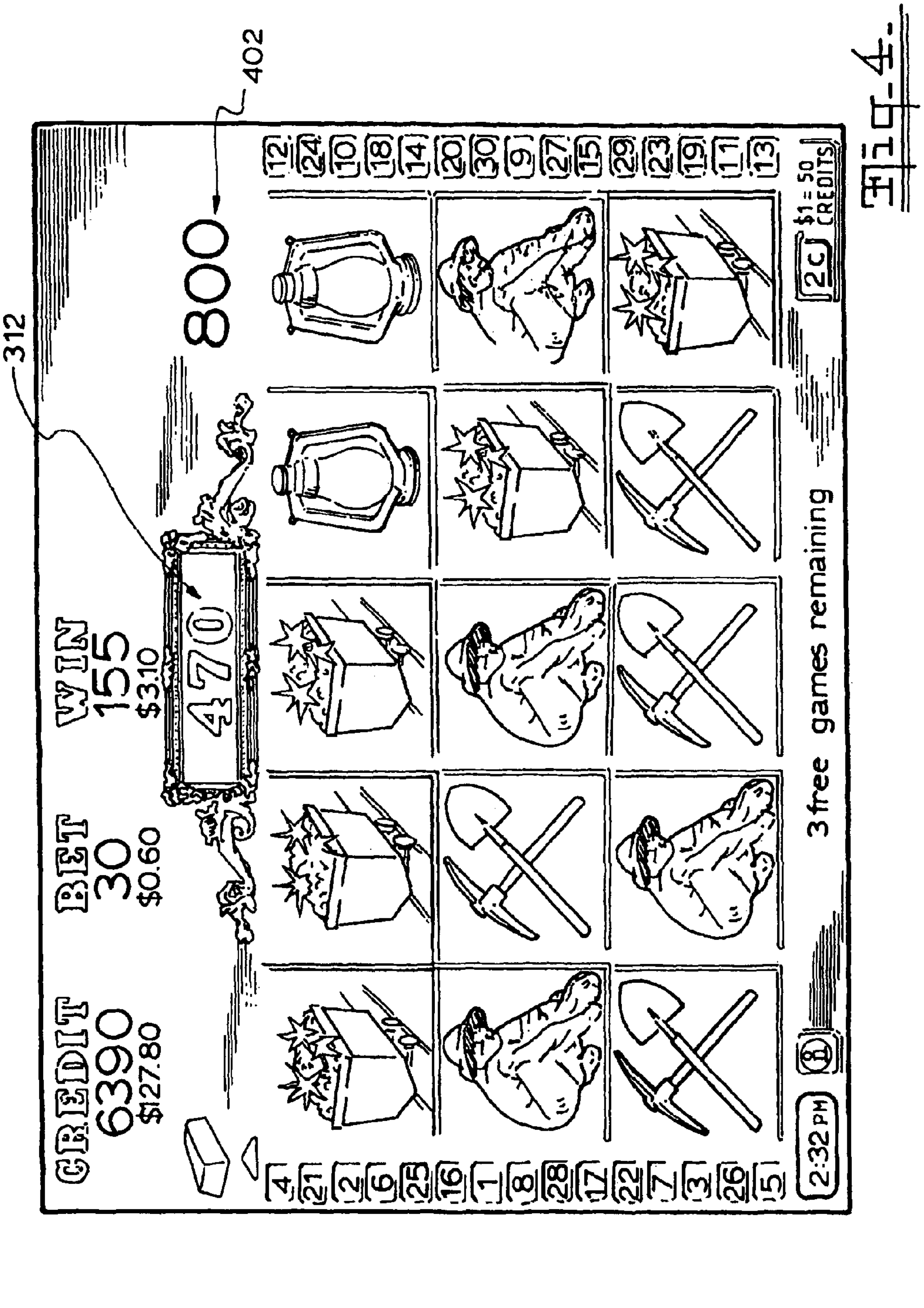
Figure 5:
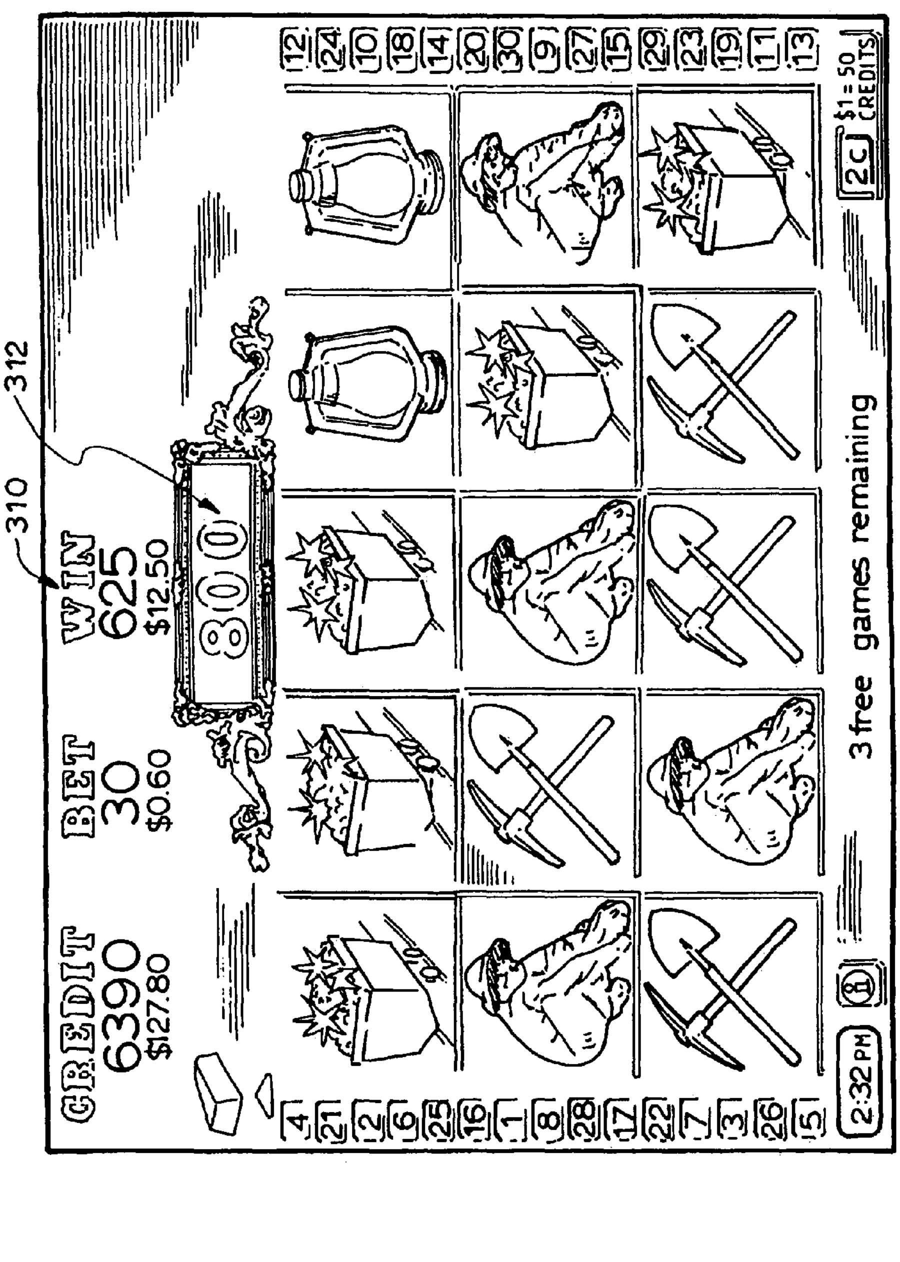

In the screenshot 300 of FIG. 3, a winning combination is shown as having occurred. The highest win meter 312 reflects the highest win from previous games as being "470." Referring to FIG. 4, the instant award value has been calculated as "800" and is temporarily displayed 402. Given that this instant award value is larger than the current highest win meter value then, as shown in FIG. 5, the highest win meter 312 is changed to show "800" and the total win meter 310 has been incremented by "470."

Figure 6:
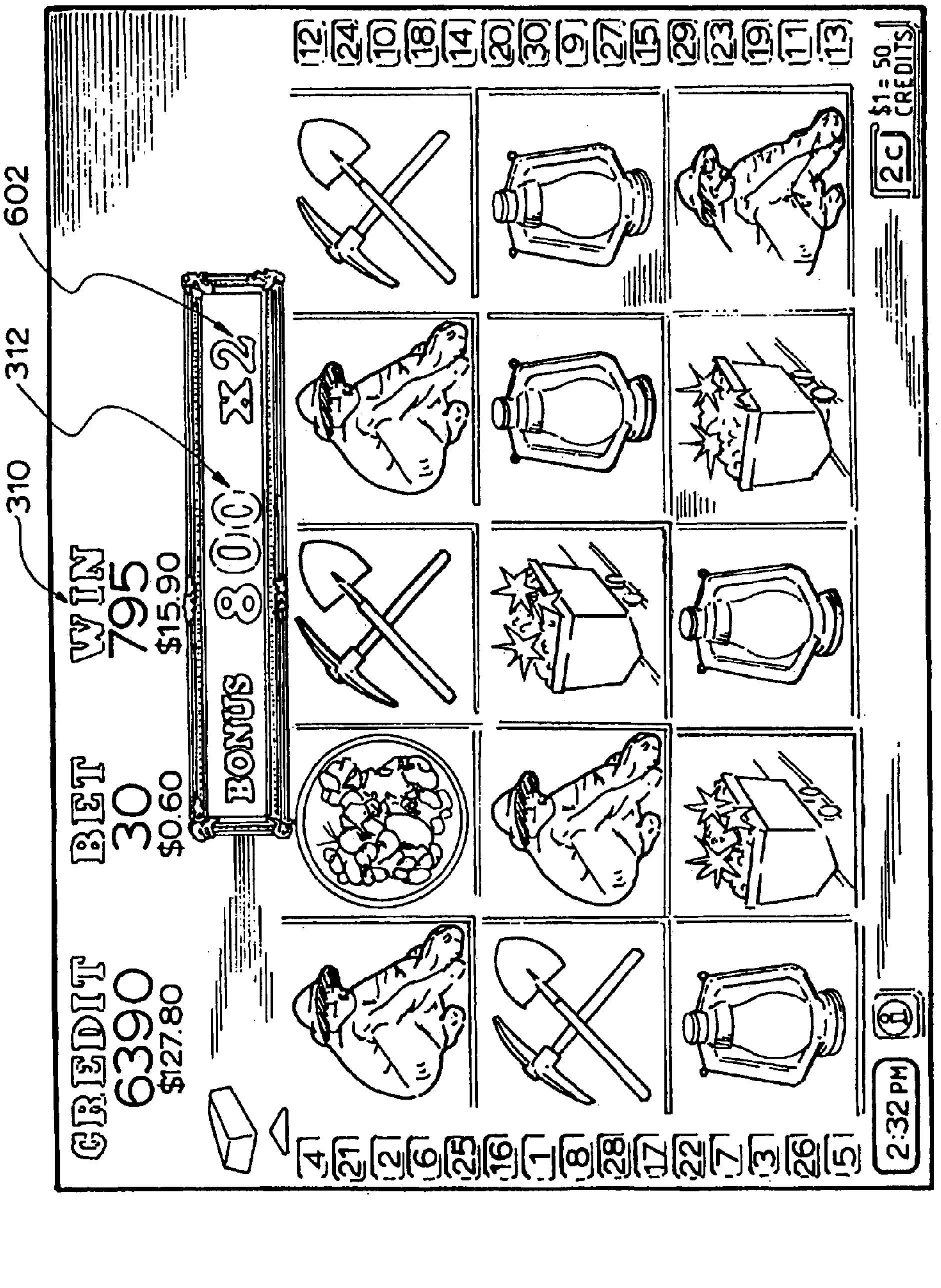

At the end of the sequential series of games a multiplier is applied to the final value appearing in the highest win meter at 722. The multiplier could be a fixed value. In exemplary embodiments, the multiplier could be any one of a number of values (e.g., 2, 3 or 5) randomly selected at 720. As shown in FIG. 6, the final highest win meter value was "800" and a ×2 multiplier 602 has been randomly selected. The resulting multiplied value is then added to the total win meter 310 at 724 (FIG. 7) and the sequence is ended at 726.

While the present invention has been described with respect to specific embodiments, it will be appreciated that various modifications and changes could be made without departing from the scope of the invention. As an example, the sequential series of games have been a series of free games awarded to the player after a corresponding trigger condition. It is perceived that the use of such a free games feature provides a convenient example of a series of games that appear on a number of existing EGMs and allows suitable adaptation to allow the invention to be implemented. However, the series of games could be triggered by some other means and could, for example, be a series of normal paid games.

It is considered that the implementation could be enhanced by providing more than one highest win meter relating to different potential win aspects. For example, one highest win meter could be employed for wins in which a winning combination appeared on a payline, while another highest win meter could be employed for wins in which the winning combination appeared as a "scatter" combination. In this respect, the two highest win meters would be independent of one another and provide the player with the potential of having two multiplied bonus awards at the end of the award feature.

The claims defining the invention are as follows:

1. A method for providing an award feature on a gaming machine comprising at least one programmed processor and memory, the method including the following acts performed by the at least one programmed processor:

providing a sequential series of games to an individual player, the games stored in memory, each game producing a game outcome which can be a winning or losing outcome, wherein a winning outcome results in an award value;

storing each award value from play of games of the sequential series by the individual player in memory;

determining the highest award value from the series of games played on the gaming machine by the individual player;

prior to adding the highest award value to a total of award values, not including the highest award value, of the individual player, applying a multiplier to the highest award value and adding the multiplied highest award value to the total of award values, not including the highest award value, of the individual player.

2. The method according to claim 1, wherein the sequential series of games is triggered upon a trigger condition occurring in a preceding game.

3. The method according to claim 2, wherein the sequential series of games is a series of free games.

4. The method according to claim 2, wherein the number of games in the sequential series is a predetermined number.

5. The method according to claim 2, wherein the number of games in the series is a randomly or pseudo-randomly selected integer number.

6. The method according to claim 1, wherein the multiplier is a predetermined number.

7. The method according to claim 1, wherein the multiplier is randomly or pseudo-randomly selected from a set of numbers.

8. A method for providing an award feature on a gaming machine comprising at least one programmed processor and memory, the method including the following acts performed by the at least one processor:

providing a sequential series of games to a player, the games stored in memory, each game of the sequential series producing a game outcome which can be a winning or losing outcome, wherein a winning outcome results in an award value;

prior to commencing the sequential series of games, setting a current highest award value to zero;

for each game in the sequential series in which a winning outcome occurs:

determining the resulting instant award value;

comparing the resulting instant award value with the current highest award value;

if the resulting instant award value is larger than the current highest award value then:

adding the current highest award value to the player's award total; and changing the current highest award value to be the same as the larger instant award value;

if the resulting instant award value is not larger than the current highest award value, adding the instant award value to the player's award total;

at the conclusion of the sequential series of games, applying a multiplier to the current highest award value to obtain a multiplied value; and adding the multiplied value to the player's award total.

9. The method according to claim 8, wherein the sequential series of games is triggered upon a trigger condition occurring in a preceding game.

10. The method according to claim 9, wherein the sequential series of games is a series of free games.

11. The method according to claim 9, wherein the number of games in the series is a predetermined number.

12. The method according to claim 9, wherein the number of games in the series is a randomly or pseudo-randomly selected integer number.

13. The method according to claim 9, wherein the current highest award value is a first current highest award value that is activated when the trigger condition is a particular type of trigger condition, the method further including providing a second current highest award value, which is independent of the first current highest award value; the second current highest award value being activated when the trigger condition is a different type of trigger condition.

14. The method according to claim 8, wherein the multiplier is a predetermined number.

15. The method according to claim 8, wherein the multiplier is randomly or pseudo-randomly selected from a set of numbers.

16. An electronic gaming machine, comprising:

at least one processor; and memory;

wherein the at least one processor is programmed to:

provide a sequential series of games to a single player on the electronic gaming machine, the games stored in memory, each game producing a game outcome which can be a winning or losing outcome, wherein a winning outcome results in an award value;

store each award value from play of games of the sequential series by the single player in memory;

determine a highest single-award value from the series of games played on the electronic gaming machine by the single player;

prior to adding the highest award value to a total of award values, not including the highest award value, of the single player, applying a multiplier to the highest award value and adding the multiplied highest award value to the total of award values, not including the highest award value, of the single player.

17. The electronic gaming machine according to claim 16, wherein the sequential series of games is triggered by the at least one processor upon a trigger condition occurring in a preceding game.

18. The electronic gaming machine according to claim 17, wherein the sequential series of games is a series of free games.

19. The electronic gaming machine according to claim 17, wherein the number of games in the sequential series is a predetermined number.

20. The electronic gaming machine according to claim 17, wherein the number of games in the series is a randomly or pseudo-randomly selected integer number.

21. The electronic gaming machine according to claim 16, wherein the multiplier is a predetermined number.

22. The electronic gaming machine according to claim 16, wherein the multiplier is randomly or pseudo-randomly selected from a set of numbers.

23. An electronic gaming machine, comprising:

at least one processor; and memory;

wherein the at least one processor is programmed to:

provide a sequential series of games to a player, the games stored in memory, each game of the sequential series producing a game outcome which can be a winning or losing outcome, wherein a winning outcome results in an award value;

prior to commencing the sequential series of games, setting a current highest award value to zero;

for each game in the sequential series in which a winning outcome occurs:

determine the resulting instant award value;

compare the resulting instant award value with the current highest award value;

if the resulting instant award value is larger than the current highest award value then:

add the current highest award value to the player's award total; and change the current highest award value to be the same as the larger instant award value;

if the resulting instant award value is not larger than the current highest award value, add the instant award value to the player's award total;

at the conclusion of the sequential series of games, apply a multiplier to the current highest award value to obtain a multiplied value; and add the multiplied value to the player's award total.

24. The electronic gaming machine according to claim 23, wherein the sequential series of games is triggered by the at least one processor upon a trigger condition occurring in a preceding game.

25. The electronic gaming machine according to claim 24, wherein the sequential series of games is a series of free games.

26. The electronic gaming machine according to claim 24, wherein the number of games in the series is a predetermined number.

27. The electronic gaming machine according to claim 24, wherein the number of games in the series is a randomly or pseudo-randomly selected integer number.

28. The electronic gaming machine according to claim 24, wherein the current highest award value is a first current highest award value that is activated when the trigger condition is a particular type of trigger condition, the at least one processor further programmed to provide a second current highest award value, which is independent of the first current highest award value; the second current highest award value being activated when the trigger condition is a different type of trigger condition.

29. The electronic gaming machine according to claim 23, wherein the multiplier is a predetermined number.

30. The electronic gaming machine according to claim 23, wherein the multiplier is randomly or pseudo-randomly selected from a set of numbers.

* * * * *

UNITED STATES PATENT AND TRADEMARK OFFICE

CERTIFICATE OF CORRECTION

PATENT NO. : 8,708,803 B2
APPLICATION NO. : 13/392359
DATED : April 29, 2014
INVENTOR(S) : Ross M. Gilbertson et al.

It is certified that error appears in the above-identified patent and that said Letters Patent is hereby corrected as shown below:

On the title page:
In ITEM (73) Assignee: change "Entertainment" to --entertainment--

In the claims:
CLAIM 16, COLUMN 6, LINE 3, change "single-award value" to --award value--

Signed and Sealed this
Fifteenth Day of September, 2015

Michelle K. Lee

Michelle K. Lee
*Director of the United States Patent and Trademark Office*